United States Patent Office 3,498,885
Patented Mar. 3, 1970

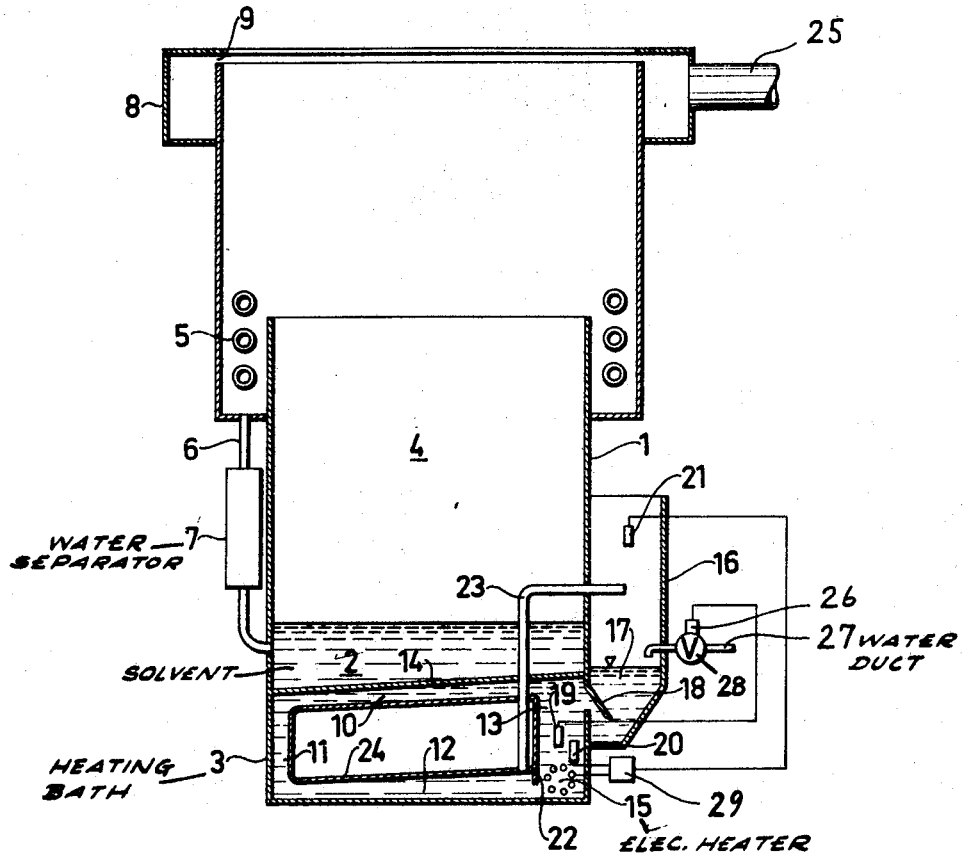

3,498,885
APPARATUS FOR THE DEGREASING OF ARTICLES BY MEANS OF A CHLORINATED HYDROCARBON SOLVENT
Kurt Anders Holm and Sven Erik Leonard Nord, Skoghall, and Bengt Gunnar Berglund, Hammaro, Sweden, assignors to Uddeholms Aktiebolag, Uddeholm, Sweden, a company of Sweden
Filed Nov. 3, 1967, Ser. No. 680,585
Claims priority, application Sweden, Nov. 14, 1966, 15,568/66
Int. Cl. B08b 3/00
U.S. Cl. 202—160                          6 Claims

ABSTRACT OF THE DISCLOSURE

The invention is concerned with the degreasing of articles by means of a chlorinated hydrocarbon solvent. A heating chamber containing an aqueous solution having an increased boiling temperature is used for heating the solvent. The heating chamber is so designed that a superheating results in a steam layer which reduces the heat transfer from the heating chamber to the solvent.

---

The invention is concerned with an apparatus for the degreasing of articles by means of a chlorinated hydrocarbon solvent, preferably trichlorethylene and tetrachlorethylene. The invention is more particularly concerned with means for heating the solvent in an apparatus of this type. The invention is concerned not only with treating the articles with a heated liquid solvent, but also with introducing the articles into the vapour of the boiling solvent, resulting in the vapour condensing on the comparatively cold articles, thus dissolving oil and fat.

The general object of the invention is to provide heating means which cannot cause a harmful superheating of the chlorinated hydrocarbon. A superheating results in a decomposition forming chlorinated products which are harmful to men and to materials. The invention comprises a particular embodiment making such a harmful superheating impossible, even if the entire safety equipment of the apparatus does not operate. It is a particular object of the invention to provide heating means containing a water bath operating at a temperature above 100° C. without the pressure exceeding the atmospheric pressure.

The apparatus of the invention comprises a container for the solvent, a heating chamber below the container, in said heating chamber a liquid which is in contact with the bottom of the container, thus transferring heat to the container, and means in said heating chamber for heating the liquid. The apparatus is characterized in that the liquid in the heating chamber is an aqueous solution of a substance which increases the boiling point, preferably a salt, such as potassium acetate, in that the heating chamber communicates with a space for a liquid, said space serving as an expansion chamber to prevent the pressure in the heating chamber to exceed the atmospheric pressure, and in that the communication between the heating chamber and the expansion chamber consists of a liquid lock which is so designed that the steam which may be produced in the heating chamber as a result of a reduced heat transfer to the solvent forms a steam layer below the bottom of the container for the solvent.

The invention will now be described with reference to the accompanying drawing which illustrates an embodiment of the degreasing apparatus of the invention.

The illustrated apparatus contains a container 1 having liquid trichlorethylene in its lower portion 2. The trichlorethylene can be heated to boil by means of a heating means 3. The vapour thus formed fills the degreasing zone 4 into which the articles to be degreased are lowered. The vapour condenses on the articles, and the solvent and the oil dissolved therein flows down into the boiling zone 2 in which the oil is concentrated. The upper level of the vapour is determined by the upper edge of the wall 1. The heavy solvent vapour flows over said upper edge and condenses on cooling tubes 5. The solvent thus condensed flows through a tube 6 to a water separator and alkalizer 7 in which acid impurities, if any, are neutralized, and then flows back to the boiling zone 2. A suction chamber 8 having a slot 9 extends around the opening of the apparatus, and communicates through a conduit 25 with a suction fan, not illustrated. In this way solvent vapour is prevented from leaking into the surrounding air.

The heating means 3 contain a chamber having an annular shape, as seen in a vertical cross-section. The chamber has an upper horizontal portion 10, the upper wall of which is the bottom 14 of the container 1, a lower horizontal portion 12, and two vertical portions 11 and 13. The walls 14 and 24 of said two horizontal portions of the heating chamber are slanting with their lowest portions to the left. The heating chamber contains an aqueous solution of potassium acetate. When trichloracetylene is used as solvent said aqueous solution should preferably have a concentration of 55 percent by weight, resulting in a boiling point of 120° C. at normal pressure. The right-hand vertical portion 13 contains a heating apparatus 15, containing electrical heating elements.

Adjacent the vertical portion 13 of the heating chamber is a wall 16 defining a chamber 17 communicating with the heating chamber. This chamber 17 contains liquid and serves an expansion chamber and as liquid supply, should an undesired evaporation take place. A substantially vertical wall 18 is provided between the heating chamber and the expansion chamber. This wall 18 forms a liquid lock, the function of which will be described below.

A vertical wall 22 is provided at the junction of the lower horizontal portion 12 and the right-hand vertical portion 13 of the heating chamber. Close to said wall 22 is the lower end of the tube 23 having its other end communicating with the atmosphere at a level above the liquid level in the expansion chamber 17.

The apparatus contains a thermostat 19 which is connected to a relay 26 actuating a magnetic valve 28 in a supply pipe 27 for water. The valve 28 opens if the temperature of the solution increases to a few degrees above the desired boiling point. In this way water is supplied for the water evaporating through the expansion chamber 17.

The apparatus contains a thermostat 20, which is connected to a relay 29 controlling the supply of electric current to the heating elements 15. The relay 29 switches off the electric current to the heating element 15 if the temperature of the liquid continues to increase, that is if the water supply through the pipe 27 fails. After such a switch-off the operator has to switch on the current manually.

The apparatus also contains a thermostat 21 situated above the liquid level in the expansion chamber 17. This thermostat is also connected to the relay 29, and is set to switch off the current to the heating elements 15 when the temperature of the thermostat has increased to approximately 90° C.

The illustrated apparatus operates in this way. The electric heating element 15 is constructed with a power sufficient to heat the aqueous solution to boil. The steam bubbles flow upward in the vertical portion 13 of the heating chamber, thus producing a powerful circulation of the liquid in the annular heating chamber. Owing to the comparatively small volume of liquid the operating temperature has been reached a short time after the heating element has been switched on. When the aqueous solution is passing in the left-hand direction in the upper horizontal portion 10 of the heating chamber the steam bubbles disappear as a result of the heat transmission to the solvent in the boiling zone 2. For keeping trichlorethylene boiling, having a boiling point of 87° C., it has been found convenient to use an aqueous solution having a boiling point of approximately 120° C.

If the solvent in the boiling zone 2 disappears as a result of the boiling, or if the temperature of the solvent increases due to too high a content of oil, the heat transfer through the bottom 14 of the container 1 is reduced. As a result of this reduced heat transfer the steam bubbles will form a layer of steam which more or less covers the lower side of the wall 14. The steam which is primarily formed is superheated and has a temperature of 120° C., in spite of the atmospheric pressure, but there is still such a heat transfer through the wall 14 that steam condenses on the lower side of the wall. The water thus condensed will have a temperature of 100° C., due to the atmospheric pressure. Consequently, the reduced transfer of heat will automatically result in a reduction of the temperature on the lower side of the wall 14 from 120° to 100° C., which is a safety against superheating.

A continued reduced heat transfer will result in an increasing thickness of the steam layer, until steam passes below the wall 18 into the expansion chamber 17. When the aqueous solution in the expansion chamber has been heated the steam reaches the thermostat 21 which switches off the current to the heating element 15.

What is claimed is:
1. An apparatus for de-greasing of articles by means of a chlorinated hydrocarbon solvent, comprising:
   a container for the solvent;
   heating means disposed beneath the container;
   said heating means comprising a chamber for retaining a body of liquid which is in contact with the bottom of the container and thus in heat-transferring relationship to the container, said liquid being an aqueous solution of a substance which increases the boiling point of water;
   means comprising heating elements submerged in said body of liquid and adjacent an end wall of said heating chamber for heating said body of liquid;
   an expansion chamber for said liquid disposed adjacent the heating chamber and in liquid flow communication with the heating chamber by means of an interconnecting liquid passage space permitting movement of liquid from and to said heating chamber, said space serving to prevent pressure in the heating chamber from exceeding atmospheric pressure,
   said space being above said heating means with said liquid passage space disposed generally beneath the bottom of said container and providing liquid flow communication between said heating chamber and said expansion chamber through an opening in a substantially vertical partition wall common to said heating chamber and said expansion chamber, said opening being at a level above that of said heating means and providing a liquid lock, whereby steam produced in the heating chamber as a result of a reduced heat transfer to the solvent is guided to, and forms a steam layer immediately beneath, the bottom of the container for the solvent and reducing heat transfer from the heating liquid to the solvent.

2. An apparatus for de-greasing of articles by means of a chlorinated hydrocarbon solvent, as defined in claim 1, and wherein
   said container comprises substantially plane bottom wall which is inclined from one side to the opposite side thereof; and said
   heating means is submerged in said body of liquid and in a lower vertical portion of said heating chamber which is adjacent the highest portion of the bottom wall of said container for heating said body of liquid to a temperature at which steam bubbles are formed in said body of liquid adjacent said heating means.

3. An apparatus as claimed in claim 1 for the degreasing of articles by means of the vapour of boiling trichlorethylene or tetrachlorethylene, characterized in that the liquid in the heating chamber consists of an aqueous solution of a salt, preferably potassium acetate, in a concentration to give the solution a boiling point of 115–150° C.

4. An apparatus as claimed in claim 1 in which the heating chamber, as seen in a vertical cross-section, has the shape of an annular chamber having two substantially vertical portions and two substantially horizontal portions, the heating means being located in one of the vertical portions.

5. An apparatus as claimed in claim 4, characterized in that the heating means is constructed for a power sufficient to produce steam bubbles in the liquid, said steam bubbles increasing the circulation of the liquid in the heating chamber.

6. The apparatus defined in claim 2, further characterized in that said heating means is an electric heater connected to a supply of electric current, and in that the apparatus includes a temperature control system comprising
   (a) switching means interposed in the current supply to said electric heater,
   (b) a first thermostat located in said heating chamber above said electric heater and connected to said switching means, and
   (c) a second thermostat located in said expansion chamber, at a level therein above the bottom of said container, and connected to said switching means, each of said thermostats being set to actuate said switching means in the event ambient temperatures exceed predetermined maxima.

References Cited

UNITED STATES PATENTS

| 1,973,426 | 9/1934 | Booth et al. | |
| 2,253,579 | 8/1941 | Phillips et al. | |
| 2,447,840 | 8/1948 | Boss | 202—170 X |
| 2,527,349 | 10/1950 | Black | 202—170 |
| 3,123,083 | 3/1964 | Kearney et al. | 134—60 |
| 3,242,933 | 3/1966 | Huff | 134—68 X |

FOREIGN PATENTS

| 679,718 | 9/1952 | Great Britain. |

NORMAN YUDKOFF, Primary Examiner

F. E. DRUMMOND, Assistant Examiner

U.S. Cl. X.R.

134—68; 202—170